United States Patent [19]
Benard

[11] Patent Number: 4,622,676
[45] Date of Patent: Nov. 11, 1986

[54] UPCONVERSION OF LASER RADIATION FREQUENCY IN AN OXYGEN-IODINE LASER

[75] Inventor: David J. Benard, Thousand Oaks, Calif.

[73] Assignee: Rockwell International Corporation, El Segundo, Calif.

[21] Appl. No.: 693,952

[22] Filed: Jan. 23, 1985

[51] Int. Cl.$^4$ ............................................. H01S 3/095
[52] U.S. Cl. ...................................... 372/70; 372/89; 372/58; 372/55
[58] Field of Search ........................ 372/89, 55, 70, 58

[56] References Cited

U.S. PATENT DOCUMENTS 4,318,060 3/1982 Davis .................................... 372/55
4,488,311 12/1984 Davis et al. ........................... 372/55

OTHER PUBLICATIONS

Bachar et al.; "An Efficient, Small Scale Chemical Oxygen-Iodine Laser"; Appl. Phys. Lett. 41(1); Jul. 1, 1982.
Richardson et al.; "Chemically Pumped Iodine Laser"; Appl. Phys. Lett. 35(2); Jul. 15, 1979.
Benard et al.; "Efficient Operation of a 100-W Transverse-Flow Oxygen-Iodine Chemical Laser"; Appl. Phys. Lett. 34(1); Jan. 1, 1979.
McDermott et al.; "An Electronic Transition Chemical Laser"; Appl. Phys. Lett. 32(8); Apr. 15, 1978.

Primary Examiner—Léon Scott, Jr.
Attorney, Agent, or Firm—H. Fredrick Hamann; Harry B. Field

[57] ABSTRACT

A gaseous mixture comprising iodine, oxygen and fluorine gases is circulated in a closed loop system 16 through a laser cavity 14. The gases in the cavity 14 are pumped by infrared laser radiation 12 from an iodine laser 10. A set of reactions occurs in the cavity 14 resulting in the production of excited, iodine monofluoride, molecules [IF**(B)] which emit laser radiation in the visible spectrum.

8 Claims, 1 Drawing Figure

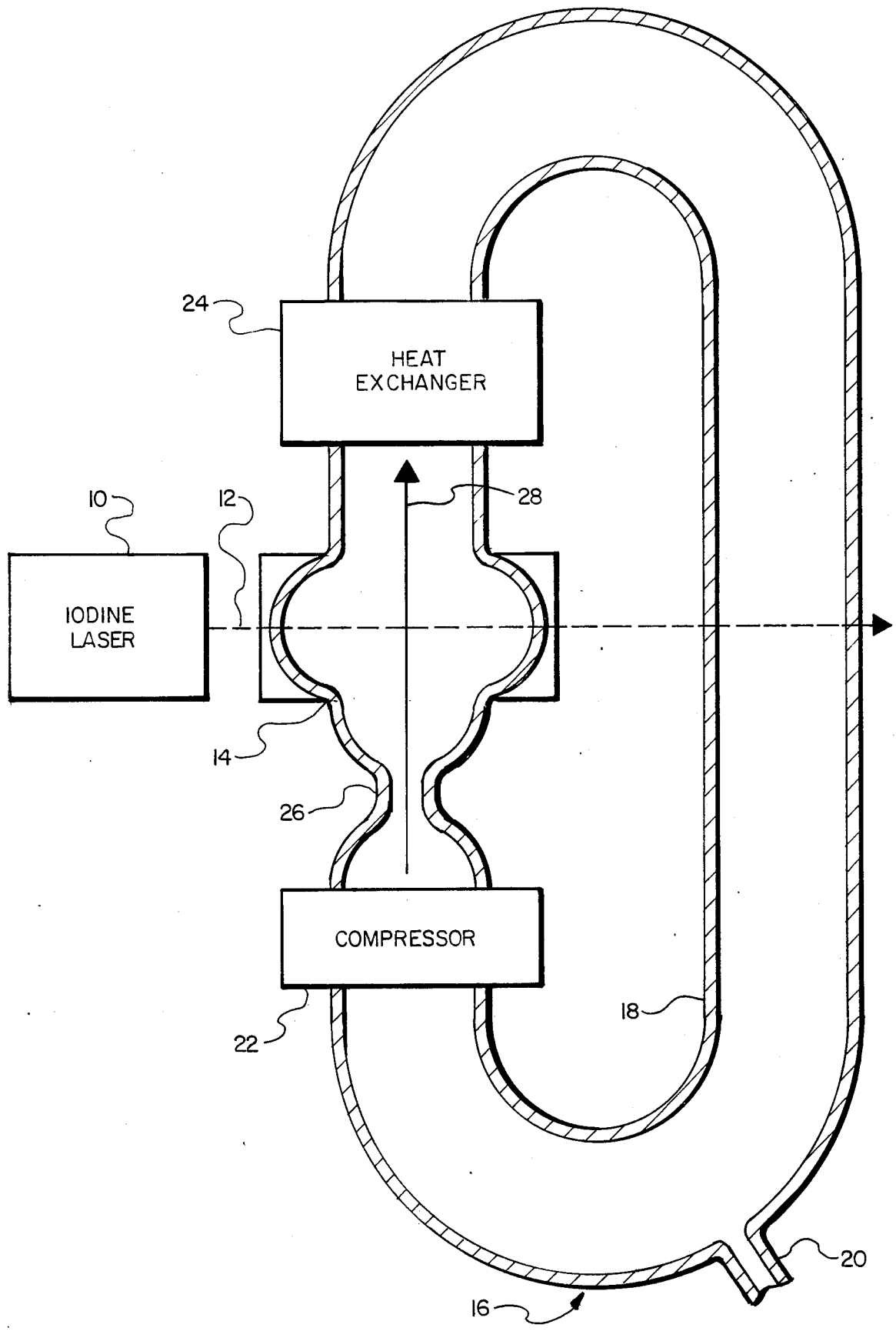

UPCONVERSION OF LASER RADIATION FREQUENCY IN AN OXYGEN-IODINE LASER

BACKGROUND OF THE INVENTION

This invention relates to chemical oxygen-iodine lasers and especially to a closed-cycle, chemical reaction systems for converting the infrared laser radiation of such lasers to visible radiation.

The chemical oxygen-iodine laser (COIL) produces radiation at a frequency of 1315 nm (IR radiation) from chemical fuels. The utility of this type of laser would be greatly enhanced if the output radiation was in the visible spectrum. Lasing at visible wavelengths from the excited (B) state of iodine monofluoride [IF(B)] has been observed. Thus, it would be useful to have a means for producing the IF(B) state in conjunction with the infrared radiation from a COIL.

OBJECTS OF THE INVENTION

An object of the invention is to convert the infrared laser radiation of a COIL to visible laser radiation.

Another object is to convert the infrared laser radiation of a COIL to visible laser radiation utilizing iodine and oxygen reactions in a closed-cycle system.

SUMMARY

The objects and advantages of the present invention are attained by utilizing the infrared laser radiation of a chemical oxygen-iodine-laser to pump iodine molecules which then react with oxygen and fluorine molecules to produce IF(B) molecules. The IF(B) molecules undergo stimulated emission and generate visible laser radiation. This may be done in a closed-cycle system.

BRIEF DESCRIPTION

The single FIGURE is a schematic illustration of an embodiment of the invention.

DETAILED DESCRIPTION

The single FIGURE is a schematic illustration of a closed-cycle system embodying the invention. The infrared laser radiation output 12 of an iodine laser 10, the wavelength of which is 1315 nm, is directed into a laser cavity 14 in a closed-cycle system 16. The closed-cycle system 16 comprises a duct 18, an inlet 20 to the duct 18, a compressor 22 upstream of the laser cavity 14 and a heat exchanger 24 downstream of the laser cavity 14.

A mixture of iodine, oxygen, fluorine and helium gases is injected into the duct 18 through an inlet pipe 20 and circulates in the direction shown by arrow 28. The mixture is compressed by a compressor 22 and the velocity of the mixture is increased by passing it through a constricted portion, or nozzle, 26 of the duct 18. The gaseous mixture is then introduced into a laser cavity 14 through which the infrared laser radiation 12 of a COIL 10 is being directed.

The iodine gas is excited by the infrared radiation and the following set of reactions occurs:

$$h\nu_{1315} + I \rightleftarrows I^* \tag{1}$$

$$I^* + O_2 \rightleftarrows I + O_2^*(^1\Delta) \tag{2}$$

$$I^* + O_2^* \rightarrow I + O_2^{**}(^1\Sigma) \tag{3}$$

$$IF + O_2^{**} \rightleftarrows IF^*(^3\pi_2) + O_2 \tag{4}$$

$$IF^*(^3\pi_2) + O_2^* \rightleftarrows IF^{**}(B) + O_2 \tag{5}$$

$$IF^{**}(B) \rightarrow IF + h\nu_{visible} \tag{6}$$

where
  *denotes the first electronically excited energy level,
  **denotes a second or higher electronically excited energy level,
the terms inside the parentheses indicate the precise excited state of the molecule,
  h is Planck's constant,
  v is frequency of the laser light,
  I is iodine,
  O is oxygen,
  F is fluorine.

When the doubly excited IF**(B) molecules release their excitation energy, laser radiation in the visible spectrum is generated.

A satisfactory mixture of iodine, oxygen and fluorine gases may involve equal concentrations (molecules/cc) of the gases, although these amounts are not critical. These reagents may be contained in a much larger concentration of an inert buffer gas such as He, Ar or $N_2$.

Reactions (3) and (6) result in the release of heat energy to the gaseous mixture which heat energy is then removed by passing the mixture through the heat exchanger 24. The gas is then recycled through the closed loop.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for converting infrared laser, radiation to visible laser radiation comprising the steps of:
   injecting a mixture of iodine, oxygen and fluorine gases into a laser cavity; and
   passing infrared laser radiation having a wavelength of 1315 nm through the gases in said cavity to excite molecules therein and cause reactions among the molecules resulting in the production of excited IF**(B) molecules which release their excitation energy to produce visible laser radiation.

2. A method as in claim 1, wherein:
   the concentrations of iodine, oxygen and fluorine gas in the mixture are equal.

3. A method as in claim 1, wherein:
   the gases are contained and circulated in a closed-cycle system.

4. A method as in claim 1, wherein:
   the infrared laser radiation is produced by a chemical iodine laser.

5. Apparatus for converting infrared laser radiation to visible laser radiation comprising:
   laser cavity means;
   means for injecting a mixture of iodine, oxygen and fluorine gas into said cavity means; and
   means for directing infrared laser radiation having a wavelength of 1315 nm through said gaseous mixture in said laser cavity resulting in the following chemical reactions:

$$h\nu_{1315} + I \rightleftarrows I^*$$

$$I^* + O_2 \rightleftarrows I + O_2^* \, (^1\Delta)$$

$$I^* + O_2^* \rightarrow I + O_2^{**} \, (^1\Sigma)$$

$$IF + O_2^{**} \rightleftharpoons IF^*(^3\pi_2) + O_2$$

$$IF^*(^3\pi_2) + O_2^* = IF^{**}(B) + O_2$$

$$IF^{**}(B) \rightarrow IF + h\nu_{visible}$$

where * denotes the first electronically excited energy level, and ** denotes a second or higher electronically excited energy level said chemical reactions among said gases producing an excited compound which lases in the visible spectrum.

6. Apparatus as in claim 5, including:
a closed-cycle system for containing and circulating said mixture of gases.

7. Apparatus as in claim 5, wherein:
the concentrations of iodine, oxygen and fluorine as in the mixture are equal.

8. Apparatus as in claim 6, wherein said closed-cycle system includes:
a duct having an inlet to admit gases and a constriction therein upstream of said cavity means;
a compressor coupled to said duct and located upstream of said constriction; and
heat exchanger means coupled to said duct just downstream of said laser cavity for cooling said gaseous mixture after it leaves the laser cavity.

* * * * *